United States Patent [19]

Campbell

[11] Patent Number: 4,936,884
[45] Date of Patent: Jun. 26, 1990

[54] GRASS CUTTING DEVICE

[75] Inventor: David L. Campbell, Houston, Tex.

[73] Assignees: Wesley R. Oder; Stephen M. Bingham, both of Houston, Tex.; part interest to each

[21] Appl. No.: 287,337
[22] Filed: Dec. 20, 1988
[51] Int. Cl.⁵ .......................................... A01D 55/18
[52] U.S. Cl. .................................. 56/12.7; 56/255; 56/295; 30/276; 30/347; 30/356; 30/DIG. 6
[58] Field of Search ............... 56/295, 12.7, 255, 12.9, 56/13.4; 30/276, DIG. 6, 347, 356

[56] References Cited

U.S. PATENT DOCUMENTS

| | | |
|---|---|---|
| 2,963,844 | 12/1960 | Engler ................................... 30/347 |
| 3,104,510 | 9/1963 | Voigt . |
| 3,156,082 | 11/1964 | Joyner . |
| 3,302,377 | 2/1967 | Ely . |
| 3,303,637 | 2/1967 | Wixson ................................. 56/295 |
| 3,340,682 | 9/1967 | Ely . |
| 3,389,541 | 6/1968 | Freedlander et al. . |
| 3,474,608 | 10/1969 | Frick . |
| 3,485,022 | 12/1969 | Freedlander et al. . |
| 3,703,071 | 11/1972 | Anderson . |
| 4,065,913 | 1/1978 | Fisher et al. . |
| 4,112,653 | 9/1978 | Ballas et al. ........................... 56/12.7 |
| 4,126,991 | 11/1978 | Gobin et al. . |
| 4,249,310 | 2/1981 | Secoura et al. ....................... 56/12.7 |
| 4,265,018 | 5/1981 | Schrock et al. ....................... 30/276 |
| 4,382,356 | 5/1983 | Ballas, Sr. et al. .................... 56/12.7 |
| 4,712,364 | 12/1987 | Oxley .................................... 56/295 |
| 4,726,176 | 2/1988 | McGrew ............................... 56/12.7 |

FOREIGN PATENT DOCUMENTS 2417174 11/1975 Fed. Rep. of Germany .

Primary Examiner—Bruce M. Kisliuk
Attorney, Agent, or Firm—Arnold, White & Durkee

[57] ABSTRACT

A cutting device is provided to replace a conventional lawnmower blade which offers improved safety, outstanding grass cutting ability, improved grass bagging suction, and a reduction in the strain on the engine. The device includes an elongated, downwardly curved rigid thermoplastic member having an upstanding airfoil at each distal end. Several elongated flexible tines extend outwardly away and downwardly from the member. The tips of these tines operate to effectively cut the grass while flexing for safety if an object is encountered, such as a rock or toe. The airfoils increase the suction within the mowing cavity to increase the grass bagging efficiency. The downwardly curved configuration presents the tips of the tines for grass cutting while reducing or eliminating the drag of the member on the grass.

21 Claims, 2 Drawing Sheets

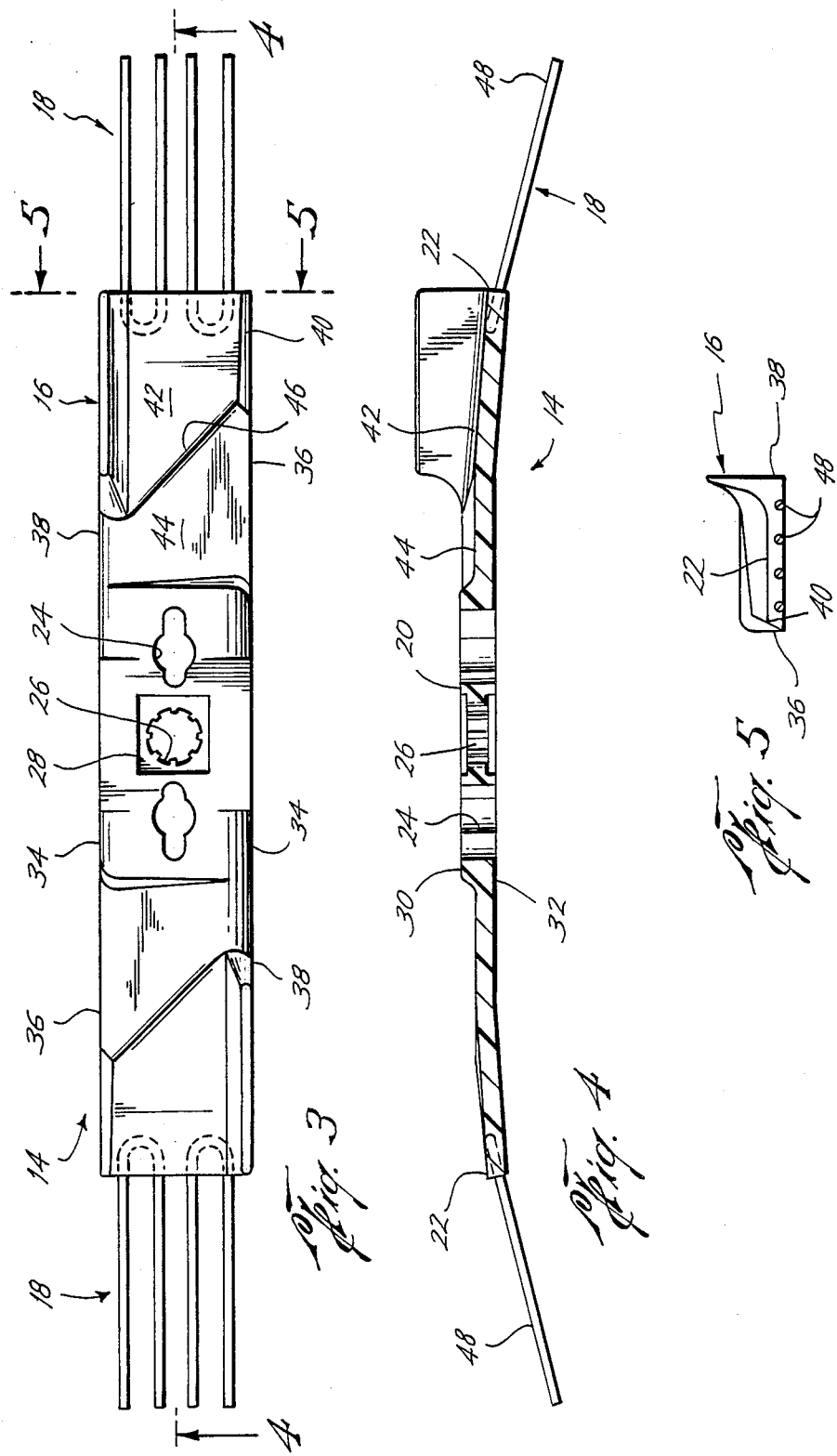

GRASS CUTTING DEVICE

BACKGROUND OF THE INVENTION

1. Field of the Invention

The present invention relates to a device for cutting grass which enhances cutting efficiency while increasing safety. In particular, the cutting device hereof includes an elongated, downwardly curved rigid, support member having a pair of upstanding airfoils and a plurality of outwardly extending flexible cutting tines attached to each end.

2. Description of the Related Art

Injuries relating to the operation of lawnmowers are a leading cause of home accidents. In 1987, almost 70,000 people sustained lawnmower contact injuries in which toes, fingers or the like were injured. Almost 140,000 people sustained eye injuries in 1987 from operation of a lawnmower.

While the dangerous operating characteristics of a lawnmower are readily apparent, easy solutions do not exist. The sharp steel blade of a conventional mower is inherently dangerous if it is to function to efficiently cut grass. The Consumer Product Safety Commission has a number of safety guidelines for lawnmower construction which have helped to reduce somewhat the number of lawnmower related injuries. For example, 16 C.F.R. §1205.4 relates to a "toe test" which all new lawnmowers must pass. Additionally, various types of clutches and deadman switches are now required on most types of lawnmowers.

Recognizing this safety problem, many lawnmower manufacturing companies have proposed somewhat exotic designs aimed at providing improved safety or improved cutting ability. Such designs include U.S. Pat. Nos. 4,126,991; 4,065,913; 3,389,541; 3,156,082; 3,302,377; 3,340,682; 3,474,608; and 3,485,022. However, none of these attempts have been successful in providing a cost effective safe blade which can be substituted for conventional lawnmower blades and still adequately cut the grass.

SUMMARY OF THE INVENTION

The problems outlined above are generally solved by the cutting device of the present invention. Broadly speaking, the grass cutting device hereof includes an elongated, curved, rigid support member having attachment structure at a central location. A pair of upstanding airfoils are mounted to the support member to provide suction during operation in the mowing cavity, which is especially useful for lawnmowers with bags. At least one flexible tine is attached to each end of the support member and downwardly curved such that the distal tip of each tine is below the level of the support member on the lawnmower.

During operation, the elongated flexible tine achieves a relatively straight orientation into the cutting position above about 1,700 RPMs. In the cutting position, the distal tips of the tines are below the support member so that drag is minimal on the device. This orientation of the tines not only provides an outstanding cutting mechanism, but also reduces the drag on the cutting device and consequently the strain on the engine. Even with relatively little strain, the airfoils on the member create a significant amount of suction in the mowing cavity to provide grass, leaf, etc. pickup. In the present application the term "grass" is used in a broad sense and includes any ground cover that may be cut back such as weeds, vines, etc. Preferably, the member and tines are made of a thermoplastic material which, of course, does not rust. Because the tines do the cutting, the cutting device never needs sharpening.

In one form, the grass cutting device of the present invention includes an elongated support member having a central location disposed in a first horizontal plane and distal ends on each side of the central location disposed in a second horizontal plane spaced in parallel to the first plane. A plurality of flexible elongated tines are attached to each distal end of the member and are oriented outwardly away from the member such that the tips of the tines are disposed in a third horizontal plane generally parallel and spaced from the second plane. Preferably, the member is curved in about a 5° arc such that the distal ends of the member are at about a 5° angle relative to the first plane at the central location. The tips of the tines are preferably at about a 10° to 15° angle relative to the first plane at the central location. In a preferred embodiment, the tines extend greater than about 3 inches and may be easily cut back to fit the size of the lawnmower cavity. The central location includes one or more apertures which are adapted for attaching the member to the lawnmower, and are preferably in a universal configuration so that the cutting device can be attached to a wide variety of lawnmowers.

BRIEF DESCRIPTION OF THE DRAWINGS

FIG. 3 is a plan view of the cutting device of the present invention with attachment portions of the tine shown dotted in for clarity;

FIG. 4 is a vertical sectional view along line 4—4 of FIG. 3; and

FIG. 5 is a vertical sectional view taken along line 5—5 of FIG. 3.

DESCRIPTION OF THE PREFERRED EMBODIMENTS

Figure 1:
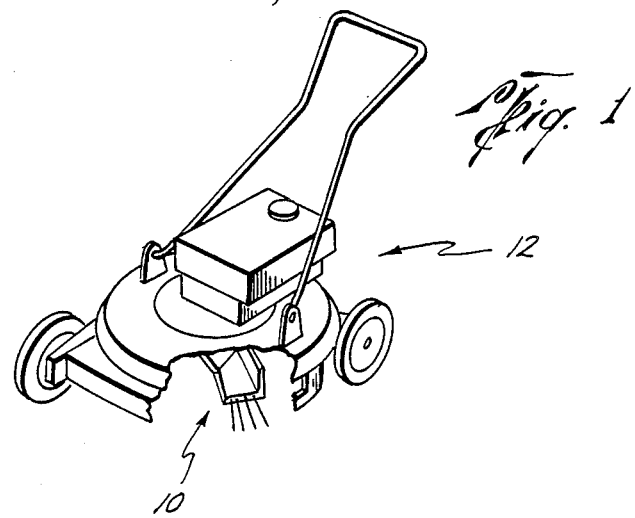
FIG. 1 is a perspective view of a lawnmower with parts broken away to view a portion of the cutting device of the present invention.

Turning to the drawings, a cutting device 10 in accordance with the present invention is shown, with FIG. 1 illustrating the device 10 coupled to a lawnmower 12. Broadly speaking, the device 10 includes an elongated rigid, support member 14 having a pair of airfoils 16 mounted adjacent each distal end (see FIG. 2). A plurality of flexible tines 18 are attached to the distal ends of the support member 14 and are adapted for cutting the grass.

In more detail, the support member includes a central location 20 and a pair of distal ends 22. As shown in FIG. 4, the support member 14 is curved in about a 5° arc such that the distal ends 22 are below the level of the central location 20 with the cutting device 10 attached to the lawnmower 12. That is, in FIG. 4 with a horizontal plane traversing the central location 20, a second horizontal plane traverses the distal ends 22 with the second plane disposed parallel and below the first horizontal plane.

Figure 2:
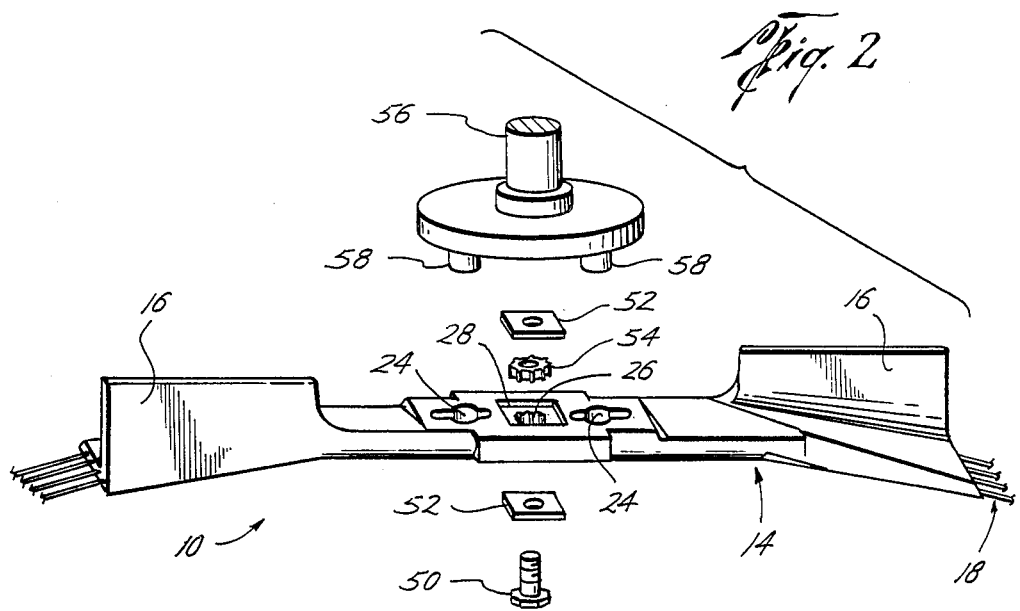
FIG. 2 is an exploded perspective view in partial fragment of the cutting device hereof.

The central location includes a plurality of apertures for mounting the cutting device 10 to the lawnmower 12 (see FIGS. 2 and 3). The apertures include a pair of spaced apart cutouts 24 and a central, notched bore 26 circumscribed by square countersinks 28.

The support member 14 includes an upper surface 30 which, with the cutting device 10 attached, is oriented towards the lawnmower and an opposed, lower surface 32 (FIG. 4). Lateral side margins 34 run between the respective distal ends 22 and generally define leading edges 36 and trailing edges 38. As can be appreciated, the leading edges 36 are cater cornered relative to each other across the central location 20 and are disposed in the direction of rotation of the cutting device 10—in the drawing rotation is clockwise (see FIG. 3).

The upstanding airfoils 16 are preferably located along the respective trailing edges 38 proximate to the respective distal ends 22. As shown in FIG. 3 each leading edge 36 includes a bevel 40 and planar surface 42 extending from the respective bevel to the airfoil 16. A second planar surface 44 adjoins the first planar surface 42 along intersecting line 46 and extends at an angle towards the central location.

As can be appreciated from FIGS. 3 and 4, the support member 14 is preferably a thermoplastic material with the tines being a loop of plastic set in the thermoplastic resin such that when the member 14 hardens, the tines 18 are durably attached. The tines 18 are embedded in the support member 14 in a folded-back U-shaped configuration as shown in the drawing. Preferably, the tines 18 extend greater than 3 inches beyond the distal ends 22, and may be easily cut to adjust the overall length of the cutting device 10. Although the tines 18 may be slightly curled when set, upon reaching above 1,700 RPMs, the tines 18 generally straighten into longitudinal alignment with the member 14 as shown in FIG. 3. As can be seen from FIG. 4, the tips 48 of the tines are below the member 14 during operation. That is, the tines 18 are vertically oriented at about between a 10° to 15° angle relative to the first horizontal plane intersecting the central location 20. The tips 48 of the tines are disposed generally along a third horizontal plane which is below the second horizontal plane intersecting the distal ends 22 (FIG. 4).

Turning to FIG. 2, an exemplary attachment of the cutting device 20 to a lawnmower 12 is shown, it being understood that the apertures 24-28 are configured for a universal coupling to a variety of lawnmower brands. In the attachment structure of FIG. 2, a bolt 50 extends through a square washer 52 received in the countersink 28 along lower surface 32. A toothed retainer 54 is received in the notched bore 26 and a corresponding square washer 52 received in the countersink 28 along the upper surface 30. The shank 56 of the mower 12 includes a pair of spaced apart lugs 58 and a threaded bore (not shown) for receiving the bolt 50. As can be appreciated, the lugs 58 are slidably received in the oblong cutouts 24 and the bolt 50 torqued to fix the cutting device 10 to the lawnmower 12.

In operation, the cutting device 10 is attached to the lawnmower 12, and the tines 18 straighten out at cutting speeds (if not already straight) to the approximate positions shown in FIGS. 3-4. Generally, this straight orientation of the tines 18 occurs above about 1,700 RPMs. The tips of the tines 48 (FIG. 4) are well below the lower surface 32 of the member 14, allowing the grass, weeds or the like to be cut by the tips of the tines 48 without the unnecessary drag of the member 14 on the grass. It has been found that the curved orientation of the member 14 and downward orientation of the tines 18 are effective in presenting the tips 48 of the tines 14 as a cutting surface.

During operation, the airfoils 16 provide a significant amount of suction within the mowing cavity of the mower 12 (see FIG. 1). A large percentage of the lawnmowers in use are used in conjunction with a pickup bag, and the increase in suction significantly increases the ability of the lawnmower 12 to pick up grass, leaves or the like. Additionally, the suction created by the airfoils 16 biases the grass to stand up for more efficient cutting.

Perhaps the biggest advantage of the cutting device 10 of the present invention is its unsurpassed safety. In contrast to a hard, sharp, metal blade of conventional lawnmowers, the cutting surface of the present invention is a thin, flexible tine 18. Thus, when an object is encountered during mowing, the tines 18 yield. On the other hand, when grass, or weeds are encountered, the tines 18 are travelling at sufficient RPM (up to 3,500 RPM) to efficiently cut the grass. If an object such as the toe of the user inadvertently extends under the lawnmower 12 into the lawnmower cavity, the tines 18 will generally yield and not impart permanent damage to the toe (assuming a shoe is worn). Further, when an unseen object is encountered, such as a rock or stick, the object is not dislodged and perhaps thrown at the operator as is typical using a conventional lawnmower. Of course the cutting device 10 never needs sharpening and will, not rust.

I claim:

1. A grass or weed cutting device adapted for attachment to a lawnmower, comprising:
    an elongated, rectangular, curved, rigid support member having two distal ends and structure disposed at a central location between the distal ends for attaching the member to the lawnmower;
    airfoil means attached to the member between a distal end and the central location and curved upwardly towards an upstanding orientation relative to the member, and with the device attached to the lawnmower said airfoil means being oriented towards the lawnmower and away from the grass for providing suction on the grass; and
    a plurality of elongated, transversely flexible tines attached to each distal end of the member, each tine extending outwardly from the member in general longitudinal alignment with the member, each tine having a distal tip disposed below the respective distal end of the member with the device attached to the lawnmower.

2. The device according to claim 1, wherein the member includes an upper surface oriented towards the lawnmower and an opposed lower surface.

3. The device according to claim 2, including two airfoils attached to the upper surface of the member adjacent respective distal ends.

4. The device according to claim 3, the upper surface including a first planar face adjacent and generally perpendicular to the airfoil proximate the respective distal end, and a second planar face disposed proximal and adjacent the first planar face.

5. The device according to claim 4, the second planar face being oriented at an angle relative to the first planar face.

6. The device according to claim 1, the attaching structure including one or more apertures adapted for receiving one or more projections attachable to the lawnmower.

7. The device according to claim 3, the member including leading and trailing margins between the central location and each distal end, the airfoils being attached adjacent the respective trailing margins.

8. The device according to claim 1, including at least two tines attached to each distal end and extending at least about 3 inches from the respective distal end.

9. The device according to claim 1, the central location being disposed in a first horizontal plane, the distal ends being disposed in a second horizontal plane generally parallel and spaced from the first plane, and the distal tips of the tines generally vertically spaced away from said second plane in a direction away from the first plane.

10. The device according to claim 1, the member being plastic and each tine being attached to the member with a portion of each tine intergrally molded in the member.

11. A grass cutting device comprising:
an elongated, rectangular, support member having a central location disposed in a first plane and distal ends on each side of the central location, the distal ends being disposed in a second plane generally parallel and spaced from the first plane, the member having an upper surface oriented generally away from said second plane and an opposed lower surface oriented generally towards said second plane, the upper surface having upstanding airfoils adjacent respective distal ends; and
a plurality of transversely flexible, elongated tines attached to each distal end in general longitudinal alignment with the member, the tines being oriented away from the respective distal ends with the tips of the tines being generally disposed in a third plane generally parallel and spaced from the second plane.

12. The device according to claim 11, the member having an upper surface oriented generally away from said second plane and an opposed lower surface oriented generally towards said second plane.

13. The device according to claim 12, the upper surface having upstanding airfoils adjacent respective distal ends.

14. The device according to claim 11, the member being curved in about a 5° arc with the distal ends at about a 5° angle relative to the first plane at the central location.

15. The device according to claim 11, the tips of the tines being at about a 10-15° angle relative to the first plane at the central location.

16. The device according to claim 11, the tines extending greater than about 3 inches longitudinally away from the respective distal ends.

17. The device according to claim 11, including structure defining one or more apertures adapted for attaching the member to a lawnmower.

18. A grass cutting device comprising:
an elongated, rectangular support member having:
a central location generally disposed in one plane and means for attaching the member to a lawnmower in its mowing cavity,
a pair of distal ends on each side of the central location, and
opposed upper and lower surfaces defining upper and lower directions;
airfoil means attached to the upper surface of the member between a distal end and the central location and oriented in said upper direction for creating suction within the lawnmower cavity; and
a plurality of elongated tines attached to each distal end in general longitudinal alignment with the member, each tine being flexible in all directions transverse to its longitudinal axis and having a distal tip generally disposed in another plane generally parallel and spaced from said one plane and extending generally in said lower direction.

19. The device according to claim 18, the member being curved in about a 5° arc with the distal ends at about a 5° angle relative to said one pane at the central location.

20. The device according to claim 18, the tips of the tines being at about a 10-15° angle relative to said one plane at the central location.

21. The device according to claim 18, the attaching means including structure defining one or more apertures adapted for attaching the member to a lawnmower drive shaft.

* * * * *

UNITED STATES PATENT AND TRADEMARK OFFICE
CERTIFICATE OF CORRECTION

PATENT NO. : 4,936,884
DATED : June 26, 1990
INVENTOR(S) : David L. Campbell

It is certified that error appears in the above—identified patent and that said Letters Patent is hereby corrected as shown below:

In claim 10, line 15, column 5, please delete --intergrally-- and insert therefor "integrally".

In claim 19, line 34, column 6, please delete --pane-- and insert therefor "plane".

Signed and Sealed this

First Day of October, 1991

*Attest:*

HARRY F. MANBECK, JR.

*Attesting Officer*    *Commissioner of Patents and Trademarks*